US009206298B2

(12) United States Patent
Rodman et al.

(10) Patent No.: US 9,206,298 B2
(45) Date of Patent: Dec. 8, 2015

(54) METHOD OF AEROGEL SYNTHESIS

(71) Applicant: NeXolve Corporation, Huntsville, AL (US)

(72) Inventors: David L. Rodman, Meridianville, AL (US); Garrett D. Poe, Madison, AL (US); Brandon S. Farmer, Huntsville, AL (US); Joseph C. Smith, New Market, AL (US)

(73) Assignee: NeXolve Corporation, Huntsville, AL (US)

( * ) Notice: Subject to any disclaimer, the term of this patent is extended or adjusted under 35 U.S.C. 154(b) by 283 days.

(21) Appl. No.: 13/901,453

(22) Filed: May 23, 2013

(65) Prior Publication Data

US 2014/0350134 A1    Nov. 27, 2014

(51) Int. Cl.
*C08J 9/00*    (2006.01)
*C08J 9/28*    (2006.01)
*C08G 73/10*   (2006.01)

(52) U.S. Cl.
CPC ............ *C08J 9/28* (2013.01); *C08J 2201/0543* (2013.01); *C08J 2205/026* (2013.01); *C08J 2379/08* (2013.01)

(58) Field of Classification Search
None
See application file for complete search history.

(56) References Cited

U.S. PATENT DOCUMENTS

| | | | |
|---|---|---|---|
| 4,007,050 A | 2/1977 | Laufer et al. | |
| 4,442,655 A | 4/1984 | Stroetmann | |
| 4,740,449 A | 4/1988 | Yuasa et al. | |
| 5,420,168 A | 5/1995 | Mayer et al. | |
| 5,508,341 A | 4/1996 | Mayer et al. | |
| 5,908,896 A | 6/1999 | Mayer et al. | |
| 5,966,832 A | 10/1999 | Kirkbir et al. | |
| 6,153,292 A | 11/2000 | Bell et al. | |
| 6,599,515 B1 | 7/2003 | Delmotte | |
| 7,541,187 B2 | 6/2009 | Myles et al. | |
| 7,816,413 B2 | 10/2010 | Feaver et al. | |
| 8,119,700 B2 | 2/2012 | Park et al. | |
| 8,158,556 B2 | 4/2012 | Feaver et al. | |
| 8,293,818 B2 | 10/2012 | Costantino et al. | |
| 8,404,384 B2 | 3/2013 | Feaver et al. | |
| 2004/0132845 A1* | 7/2004 | Rhine et al. | 521/82 |
| 2008/0087870 A1* | 4/2008 | Williams et al. | 252/609 |
| 2009/0035344 A1* | 2/2009 | Thomas et al. | 424/423 |
| 2011/0245362 A1* | 10/2011 | Hwang et al. | 521/180 |

FOREIGN PATENT DOCUMENTS

| | | |
|---|---|---|
| CN | 101749926 | 6/2010 |
| KR | 10-0710887 B1 | 4/2007 |
| KR | 20120059721 | 6/2012 |
| WO | 2012176024 | 12/2012 |

OTHER PUBLICATIONS

Meador et al., "Mechanically Strong, Flexible Polyimide Aerogels Cross-Linked with Aromatic Triamine," from Applied Materials and Interfaces, ACS Publications, Jan. 10, 2012, pp. 536-544.*
International Search Report and Written Opinion for International application No. PCT/US2014/015555.
Xue Mi, Guanbo Huang, Weisong Xie, Wei Wang, Yu Liu, Jianping Gao; "Preparation of graphene oxide aerogel and its adsorption for Cu2+ ions"; Carbon 50; 2012, pp. 4856-4864; SciVerse ScienceDirect.
Mary Ann B. Meador, Baochau N. Nguyen, Haiquan Guo, Stephanie Vivod, Zuhui He, Ericka Malow, Rebecca Silva; "Improvements to the synthesis of polyimide aerogels"; National Aeronautics and Space Administration.
Jason P. Randall, Mary Ann B. Meador, Sadhan C. Jana; "Tailoring Mechanical Properties of Aerogels for Aerospace Applications"; American Chemical Society; Mar. 1, 2011; pp. 613-626; vol. 3; ACS Publications.
Nathalie Samson, Francoise Mechin, Jean-Pierre Pascault; "Relationships Between Synthesis and Mechanical Properties of New Polyurea Materials"; Journal of Applied Polymer Science; Sep. 11, 1996; pp. 2265-2280; vol. 65; John Wiley & Sons, Inc.
Medha Joshi, Smita Jauhari, K.R. Desai; Polyureas: Synthesis and Characterization; International Journal of ChemTech Research; Jan.-Mar. 2011; pp. 29-32; vol. 3, No. 1; Sphinx Knowledge House.
Dudley J. Primeaux II; "Polyurea Elastomer Technology: History, Chemistry & Basic Formulating Techniques"; Primeaux Associates, LLC; 2004.
Alain C. Pierre, Gerard M. Pajonk; "Chemistry of Aerogels and Their Applications"; Chem. Rev. 2002; published on Web Oct. 18, 2002; pp. 4243-4265; vol. 102.
Haiquan Guo, Mary Ann B. Meador, Linda McCorkle, Derek J. Quade, Jiao Guo, Bart Hamilton, Miko Cakmak; "Tailoring Properties of Cross-Linked Polyimide Aerogels for Better Moisture Resistance, Flexibility, and Strength"; American Chemical Society; Sep. 6, 2012; pp. 5422-5429; vol. 4; ACS Publications.
Mary Ann B. Meador, Ericka J. Malow, Rebecca Silva, Sarah Wright, Derek Quade, Stephanie L. Vivod, Haiquan Guo, Jiao Guo, Miko Cakmak; Mechanically Strong, Flexible Polyimide Aerogels Cross-Linked with Aromatic Triamine; American Chemical Society; Jan. 10, 2012; pp. 536-544; vol. 4; ACS Publications.
Haiquan Guo, Mary Ann B. Meador, Linda McCorkle, Derek J. Quade, Jiao Guo, Bart Hamilton, Miko Cakmak, Guilherme Sprowl; "Polyimide Aerogels Cross-Linked through Amine Functionalized Polyoligomeric Silsesquioxane"; American Chemical Society; Feb. 4, 2011; pp. 546-552; vol. 3; ACS Publications.

* cited by examiner

*Primary Examiner* — Kara Boyle
(74) *Attorney, Agent, or Firm* — Jeremy A. Smith; Bradley Arant Boult Cummins LLP

(57) ABSTRACT

The present disclosure provides a method for producing an aerogel, the method comprising reacting at least one acid monomer with at least one diamino monomer in a first solvent under conditions appropriate to form a polyimide polymer; conducting a solvent exchange wherein the first solvent is exchanged for a second solvent, said second solvent having a freezing point, wherein said solvent exchange further comprises (1) submersing the polyimide polymer in the second solvent in a pressure vessel and (2) creating a high pressure environment inside the pressure vessel for a first period of time; cooling the polyimide polymer to a first temperature below the freezing point of the second solvent; and subjecting cooled polyimide polymer to a first vacuum for a second period of time at a second temperature.

23 Claims, 3 Drawing Sheets

METHOD OF AEROGEL SYNTHESIS

FIELD OF THE DISCLOSURE

The present disclosure relates to a method for producing an aerogel without using supercritical carbon dioxide drying.

BACKGROUND

Polyimides are an important class of polymeric materials and are known for many desirable performance properties. These properties include high glass transition temperatures, good mechanical strength, high Young's modulus, good UV durability, and excellent thermal stability. As a result of their favorable properties, polyimide compositions have become widely used in many industries, including the aerospace industry, the electronics industry and the telecommunications industry.

In the electronics industry, polyimide compositions are used in applications such as forming protective and stress buffer coatings for semiconductors, thermal insulating coatings, dielectric layers for multilayer integrated circuits and multi-chip modules, high temperature solder masks, bonding layers for multilayer circuits, final passivating coatings on electronic devices, and many others. In addition, polyimide compositions may form dielectric films in electrical and electronic devices such as motors, capacitors, semiconductors, printed circuit boards and other packaging structures. Polyimide compositions may also serve as an interlayer dielectric in both semiconductors and thin film multichip modules. The low dielectric constant, low stress, high modulus, and inherent ductility of polyimide compositions make them well suited for these multiple layer applications. Other uses for polyimide compositions include alignment and/or dielectric layers for displays, and as a structural layer in micromachining applications. Electronic components using polyimide films are used in many other industries.

Polyimides have many different uses in the aerospace industry, the automotive industry, the rail industry, the natural gas industry, and others. Polyimides can be used as high temperature adhesives, thermal insulations, protective coatings or layers, membranes, gaskets, and a wide variety of other uses.

The increased complexity of the applications for polyimides has created a demand to tailor the properties of such polyimides for specific applications. Compounds or moieties incorporated into a polyimide or other polymer can change the properties of that polymer. For example, dyes can be added to a polymer to change the color, and ultra violet (UV) stabilizers can be added to increase resistance to damage from UV light. Many other compounds can be added to a polymer to change various properties.

Many different compounds can be added to polymers to change the polymer properties, and these compounds can be added in different ways. The added compounds c, n be covalently bonded to the polymer, dissolved or suspended in the polymer, or otherwise included in the polymer (such as with ionic bonding.) Often, an added compound will change more than one property, so controlling one property independently from a second property can be challenging. Some polymer uses require specific ranges for several different properties, and controlling the measured value of one property can compete with controlling the value of a different property.

Aerogels are well-known in the art for their low-density and effectiveness as thermal insulators. As used herein, "aerogel" is defined as a material produced from a gel wherein the liquid component of the gel has been replaced with a gas, "micropores" is defined as pores with diameters less than 2 nm, and "mesopores" is defined as pores with diameters between 2 nm and 50 nm. Aerogels consist of a highly porous network of micropores and mesopores. The pores of an aerogel can frequently account for over 90% of the volume when the density of the aerogel about 0.05 gram/cc. Aerogels are usually prepared from silica-based materials, as well as from polymers. For both types of materials, aerogels are generally prepared by a supercritical drying technique to remove the solvent from a gel (a solid network that encapsulates its solvent) such that no solvent evaporation can occur, and consequently no contraction of the gel can be brought by capillary forces at its surface. For polymer-based aerogels, therefore, aerogel preparation typically proceeds as follows: (1) polymerization of the polymer gel; (2) formation of the gel; and (3) solvent removal by supercritical drying. Supercritical carbon dioxide drying is a sensitive, time consuming procedure that requires expensive machinery to accomplish and requires the handling of corrosive supercritical solvents which are damaging to the environment. Accordingly, there exists a need in the art for a quick, easy, robust method of producing an aerogel that eliminates the need for supercritical carbon dioxide drying.

BRIEF DESCRIPTION OF THE DRAWINGS

To further describe advantages and features of the present disclosure, a more particular description of the invention will be rendered by reference to specific embodiments thereof which are illustrated in the appended drawings. It is appreciated that these drawings are not to be considered limiting in scope. The invention will be described and explained with additional specificity and detail through the use of the accompanying drawings in which.

SUMMARY

Figure 1:
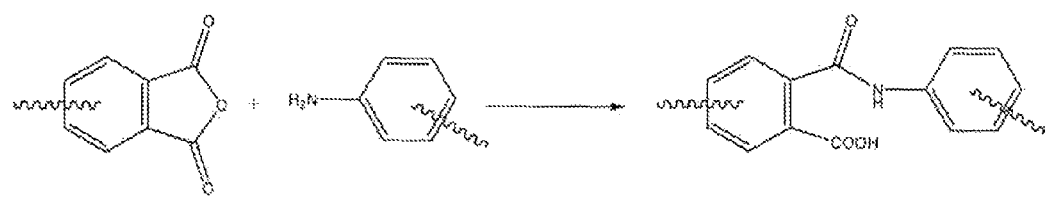
FIG. 1 depicts an example of the formation of amic acid from an anhydride and an amine.

In one aspect, the present disclosure provides a method for producing an aerogel, the method comprising reacting at least one acid monomer with at least one diamino monomer in a first solvent under conditions appropriate to form a polyimide polymer; conducting a solvent exchange wherein the first solvent is exchanged for a second solvent, said second solvent having a freezing point, wherein said solvent exchange further comprises (1) submersing the polyimide polymer in the second solvent in a pressure vessel and (2) creating a high pressure environment inside the pressure vessel for a first period of time; cooling the polyimide polymer to a first temperature below the freezing point of the second solvent; and subjecting cooled polyimide polymer to a first vacuum for a second period of time at a second temperature.

In a second aspect, the present disclosure provides a method of producing an aerogel, the method comprising reacting at least one acid monomer with at least one diamino monomer in a first solvent under conditions appropriate to form a polyimide polymer; conducting a solvent exchange wherein the first solvent is exchanged for a second solvent, said second solvent having a freezing point; cooling the polyimide polymer to a first temperature below the freezing point of the second solvent; and subjecting cooled polyimide polymer to a first vacuum for a second period of time at a second temperature.

In yet a third aspect, the present disclosure provides a method of producing a aerogel, said method comprising: reacting a first monomer with a second monomer in a first solvent to form a polymerized gel; and conducting a solvent exchange wherein the first solvent is exchanged for a second solvent, wherein said solvent exchange step further comprises subjecting the polymerized gel to a positive pressure; cooling the polymer to a first temperature below the freezing point of the second solvent; and subjecting cooled polymer to a first vacuum for a second period of time at a second temperature.

In yet a fourth aspect, the present disclosure provides a polyimide polymer aerogel manufactured by a process comprising reacting at least one acid monomer with at least one diamino monomer in a first solvent to form the polyimide precursor polymer; contacting the polyimide precursor polymer in the first solvent with a chemical dehydrating agent to form a polyimide gel by imidization; conducting a solvent exchange wherein the first solvent is exchanged for a second solvent wherein said solvent exchange further comprises creating a high pressure inside a pressure vessel containing the polyimide polymer in the presence of the second solvent for a first period of time; cooling the polyimide polymer to a first temperature below a freezing point of the second solvent; and subjecting cooled polyimide polymer to a vacuum for a second period of time at a second temperature.

DETAILED DESCRIPTION

While the invention has been described with respect to a limited number of embodiments, those skilled in the art, having benefit of this disclosure, will appreciate that other embodiments can be devised which do not depart from the scope of the invention as disclosed here.

Polymers

Step-growth polymers are an important group of polymeric chemicals that have many uses and beneficial properties. Step-growth polymers are formed via step-growth polymerization in which bifunctional or multifunctional monomers react to form first dimers, then trimers, then longer oligomers and eventually long chain polymers. Generally, step-growth polymers have robust mechanical properties including toughness and high temperature resistance that make them desirable over other polymer types. There are numerous varieties of step-growth polymers, including polyimides, polyurethanes, polyureas, polyamides, phenolic resins, and polyesters.

Polyimides

Polyimides are a type of polymer with many desirable properties. In general, polyimide polymers include a nitrogen atom in the polymer backbone, where the nitrogen atom is connected to two carbonyl carbons, such that the nitrogen atom is somewhat stabilized by the adjacent carbonyl groups. A carbonyl group includes a carbon, referred to as a carbonyl carbon, Which is double bonded to an oxygen atom. Polyimides are usually considered an AA-BB type polymer because usually two different classes of monomers are used to produce the polyimide polymer. Polyimides can also be prepared from AB type monomers. For example, an aminodicarboxylic acid monomer can be polymerized to form an AB type polyimide. Monoamines and/or mono anhydrides can be used as end capping agents if desired.

One class of polyimide monomer is usually a diamine, or a diamine monomer. The diamine monomer can also be a diisocyanate, and it is to be understood that an isocyanate could be substituted for an amine in this description, as appropriate. There are other types of monomers that can be used in place of the diamine monomer, as known to those skilled in the art. The other type of monomer is called an acid monomer, and is usually in the form of a dianhydride. In this description, the term "di-acid monomer" is defined to include a dianhydride, a tetraester, a diester acid, a tetracarboxylic acid, or a trimethylsilyl ester, all of which can react with a diamine to produce a polyimide polymer. Dianhydrides are sometimes referred to in this description, but it is to be understood that tetraesters, diester acids, tetracarboxylic acids, or trimethylsilyl esters could be substituted, as appropriate. There are also other types of monomers that can be used in place of the di-acid monomer, as known to those skilled in the art.

Because one di-acid monomer has two anhydride groups, different diamino monomers can react with each anhydride group so the di-acid monomer may become located between two different diamino monomers. The diamine monomer contains two amine functional groups; therefore, after the first amine functional group attaches to one di-acid monomer, the second amine functional group is still available to attach to another di-acid monomer, which then attaches to another diamine monomer, and so on. In this manner, the polymer backbone is formed. The resulting polycondensation reaction forms a poly(amic acid). The reaction of an anhydride with an amine to form an auric acid is depicted in FIG. 1.

The polyimide polymer is usually formed from two different types of monomers, and it is possible to mix different varieties of each type of monomer. Therefore, one, two, or more di-acid monomers can be included in the reaction vessel, as well as one, two or more diamino monomers. The total molar quantity of di-acid monomers is kept about the same as the total molar quantity of diamino monomers if a long polymer chain is desired. Because more than one type of diamine or di-acid can be used, the various monomer constituents of each polymer chain can be varied to produce polyimides with different properties.

For example, a single diamine monomer AA can be reacted with two di-acid co-monomers, $B_1B_1$ and $B_2B_2$, to form a polymer chain of the general form of $(AA-B_1B_1)_x(AA-B_2B_2)_y$ in which x and y are determined by the relative incorporations of $B_1B_1$ and $B_2B_2$ into the polymer backbone. Alternatively, diamine co-monomers $A_1A_1$ and $A_2A_2$ can be reacted with a single di-acid monomer BB to form a polymer chain of the general form of $(A_1A_1-BB)_x-(A_2A_2-BB)_y$. Additionally, two diamine co-monomers $A_1A_1$ and $A_2A_2$ can be reacted with two di-acid co-monomers $B_1B_1$ and $B_2B_2$ to form a polymer chain of the general form $(A_1A_1-B_1B_1)_w-(A_1A_1-B_2B_2)_x-(A_2A_2-B_1B_1)_y-(A_2A_2-B_2B_2)_z$, where w, x, y, and z are determined by the relative incorporation of $A_1A_1-B_1B_1$, $A_1A_1-B_2B_2$, $A_2A_2-B_1B_1$, and $A_2A_2-B_2B_2$ into the polymer backbone. More than two di-acid co-monomers and/or more than two diamine co-monomers can also be used. Therefore, one or more diamine monomers can be polymerized with one or more di-acids, and the general form of the polymer is determined by varying the amount and types of monomers used.

Polyimides may be synthesized by several methods. In the traditional two-stage method of synthesizing aromatic polyimides, a solution of the aromatic diamine in a polar aprotic solvent, such as N-methylpyrrolidone (NMP), is prepared. A di-acid monomer, usually in the form of a dianhydride, is added to this solution, but the order of addition of the monomers can be varied. For example, the di-acid monomer can be added first, or the di-acid monomer and the diamine can be simultaneously added. The resulting polycondensation reaction forms a poly(amic acid), also referred to as a polyamide acid, which is a polyimide precursor. Other polyimide precursors are known, including poly(amic ester) precursors, poly(amic acid) salt precursors, and polyisoimides. This process description may be applicable to one or more polyimide precursor solutions.

There are many examples of monomers that can be used to make polyimide polymers. A non-limiting list of possible diamine monomers comprises 4,4'-oxydianiline, 3,4'-oxydianiline, 3,3'-oxydianiline, p-phenylenediamine, m-phenylenediamine, o-phenylenediamine, diaminobenzanilide, 3,5-diaminobenzoic acid, 3,3'-diaminodiphenylsulfone, 4,4'-diaminodiphenyl sulfones, 1,3-bis-(4-aminophenoxy)benzene, 1,3-bis-(3-aminophenoxy)benzene, 1,4-bis-(4-aminophenoxy)benzene, 1,4-bis-(3-aminophenoxy)benzene, 2,2-Bis[4-(4-aminophenoxy)phenyl]-hexafluoropropane, 2,2-bis(3-aminophenyl)-1,1,1,3,3,3-hexafluoropropane, 4,4'-isopropylidenedianiline, 1-(4-aminophenoxy)-3-(3-aminophenoxy)benzene, 1-(4-aminophenoxy)-4-(3-aminophenoxy)benzene, bis-[4-(4-aminophenoxy)phenyl]sulfones, 2,2-bis[4-(3-aminophenoxy)phenyl]sulfones, bis(4-[4-aminophenoxy]phenyl)ether, 2,2'-bis-(4-aminophenyl)-hexafluoropropane, (6F-diamine), 2,2'-bis-(4-phenoxyaniline)isopropylidene, meta-phenylenediamine, para-phenylenediamine, 1,2-diaminobenzene, 4,4'-diaminodiphenylmethane, 2,2-bis(4-aminophenyl)propane, 4,4'diaminodiphenyl propane, 4,4'-diaminodiphenyl sulfide, 4,4'-diaminodiphenylsulfone, 3,4'diaminodiphenyl ether, 4,4'-diaminodiphenyl ether, 2,6-diaminopyridine, bis(3-aminophenyl)diethyl silane, 4,4'-diaminodiphenyl diethyl silane, benzidine, 3,3'-dichlorobenzidine, 3,3'-dimethoxybenzidine, 4,4'-diaminobenzophenone, N,N-bis(4-aminophenyl)-n-butylamine, N,N-bis(4-aminophenyl)methylamine, 1,5-diaminonaphthalene, 3,3'-dimethyl-4,4'-diaminobiphenyl, 4-aminophenyl-3-aminobenzoate, N,N-bis(4-aminophenyl)aniline, bis(p-beta-amino-t-butylphenyl)ether, p-bis-2-(2-methyl-4-aminopentyl)benzene, p-bis(1,1-dimethyl-5-aminopentyl)benzene, 1,3-bis(4-aminophenoxy)benzene, m-xylenediamine, p-xylenediamine, 4,4'-diaminodiphenyl ether phosphine oxide, 4,4'-diaminodiphenyl N-methyl amine, 4,4'-diaminodiphenyl N-phenyl amine, amino-terminal polydimethylsiloxanes, amino-terminal polypropyleneoxides, amino-terminal polybutyleneoxides, 4,4'-Methylenebis(2-methylcyclohexylamine), 1,2-diaminoethane, 1,3-diaminopropane, 1,4-diaminobutane, 1,5-diaminopentane, 1,6-diaminohexane, 1,7-diaminoheptane, 1,8-diaminooctane, 1,9-diaminononane, 1,10-diaminodecane, and 4,4'-methylenebisbenzeneamine.

A non-limiting list of possible diacid monomers comprises hydroquinone dianhydride, 3,3',4,4'-biphenyl tetracarboxylic dianhydride, pyromellitic dianhydride, 3,3',4,4'-benzophenone tetracarboxylic dianhydride, 4,4'-oxydiphthalic anhydride, 3,3',4,4'-diphenylsulfone tetracarboxylic dianhydride, 4,4'-(4,4'-isopropylidenediphenoxy)bis(phthalic anhydride), 2,2-bis(3,4-dicarboxyphenyl)propane dianhydride, 4,4'-(hexafluoroisopropylidene)diphthalic anhydride, bis(3,4-dicarboxyphenyl) sulfoxide dianhydride, polysiloxane-containing dianhydride, 2,2',3,3'-biphenyltetracarboxylic dianhydride, 2,3,2',3'-benzophenonetetraearboxylic dianhydride, 3,3',4,4'-benzophenonetetraearboxylic dianhydride, naphthalene-2,3,6,7-tetracarboxylic dianhydride, naphthalene-1,4,5,8-tetracarboxylie dianhydride, 4,4'-oxydiphthalic dianhydride, 3,3',4,4'-biphenylsulfone tetracarboxylic dianhydride, 3,4,9,10-perylene tetracarboxylic dianhydride, bis (3,4-dicarboxyphenyl)sulfide dianhydride, bis(3,4-dicarboxyphenyl)methane dianhydride, 2,2-bis(3,4-dicarboxyphenyl) propane dianhydride, 2,2-bis(3,4-dicarboxyphenyl) hexafluoropropane, 2,6-dichloronaphthalene-1,4,5,8-tetracarboxylic dianhydride, 2,7-dichloronapthalene-1,4,5,8-tetracarboxylic dianhydride, 2,3,6,7-tetrachloronaphthalene-1,4,5,8-tetracarboxylic dianhydride, phenanthrene-, 8,9,10-tetracarboxylie dianhydride, pyrazine-2,3,5,6-tetracarboxylic dianhydride, benzene-1,2,3,4-tetracarboxylic dianhydride, and thiophene-2,3,4,5-tetracarboxylic dianhydride.

Figure 2:
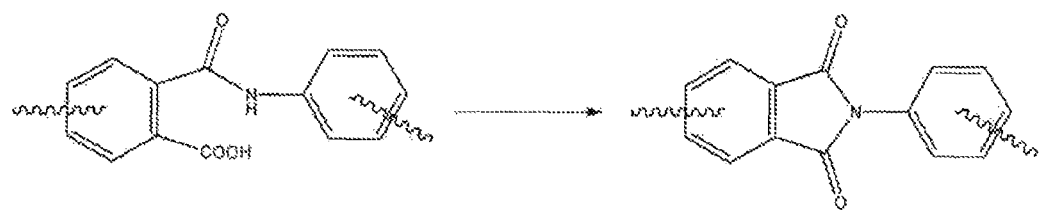
FIG. 2 depicts an example of the formation of an imide bond from an amic acid.
Figure 3:
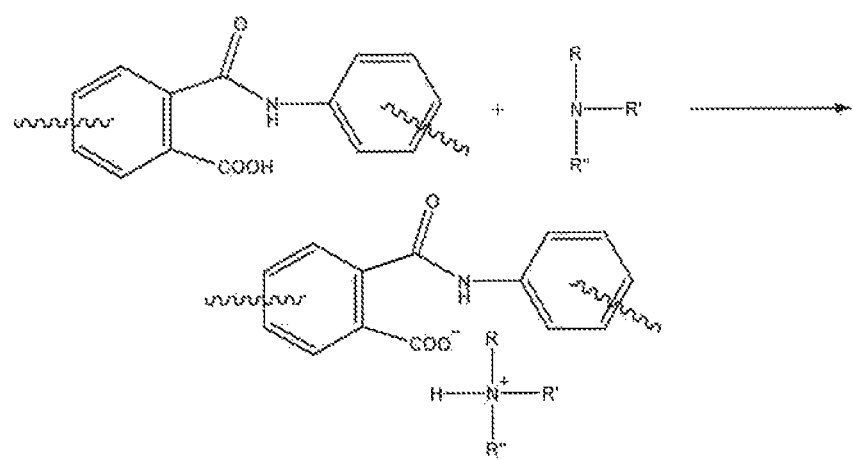
FIG. 3 depicts an example of the formation of an auric salt from a tertiary amine and an amic acid.

A poly(amic acid) is soluble in the reaction solvent and, thus, the solution may be cast into a film on a suitable substrate such as by spin casting, gravure coating, three roll coating, knife over roll coating, slot die extrusion, dip coating, or other techniques. The cast film can then be heated in stages to elevated temperatures to remove solvent and convert the amic acid functional groups in the poly(amic acid) to imides with a cyclodehydration reaction, also called imidization. "Imidization" is defined as the conversion of a polyimide precursor into an imide. Alternatively, some poly(amic acid)s may be converted in solution to polyimides by using a chemical dehydrating agent, catalyst, and/or heat. The conversion of an auric acid to an imide is shown in FIG. 2, with continuing reference to FIG. 1.

Many polyimide polymers are produced by preparing a poly(amic acid) polymer in the reaction vessel. The poly (amic acid) is then formed into a sheet or a film and subsequently processed with heat (often temperatures higher than 250 degrees Celsius) or both heat and catalysts to convert the poly(amic acid) to a polyimide. However, poly(amic acid)s are moisture sensitive, and care must be taken to avoid the uptake of water into the polymer solution. Additionally, poly (amic acid)s exhibit self-imidization in solution as they gradually convert to the polyimide structure. The imidization reaction generally reduces the polymer solubility and produces water as a by-product. The water produced can then react with the remaining poly(amic acid), thereby cleaving the polymer chain. Moreover, the poly(amic acid)s can generally not be isolated as a stable pure polymer powder. As a result, poly(amic acid)s tend to have a limited shelf life. Shelf life can be extended by storing a poly(amic acid) at reduced temperatures. For example, shelf life can be increased by storing a poly(amic acid) at temperatures less than −20 Celsius.

The characteristics or properties of the final polymer are significantly impacted by the choice of monomers which are used to produce the polymer. Factors to be considered when selecting monomers include the properties of the final polymer, such as the flexibility, thermal stability, coefficient of thermal expansion (CTE), coefficient of hydroscopic expansion (CHE) and any other properties specifically desired, as well as cost. Often, certain important properties of a polymer for a particular use can be identified. Other properties of the polymer may be less significant, or may have a wide range of acceptable values; so many different monomer combinations could be used. For example, it is important for a polymeric protective cover of a windshield to be clear, but it may be less important for the polymer to be resistant to attack from monoatomic oxygen. Other factors to be considered in the selection of monomers include the expense and availability of the monomers chosen. Commercially available monomers that are produced in large quantities generally decrease the cost of producing the polyimide polymer film since such monomers are in general less expensive than monomers produced on a lab scale and pilot scale. Additionally, the use of commercially available monomers improves the overall reaction efficiency because additional reactions are not required to produce a monomer which is incorporated into the polymer.

Most polyimides are comprised of relatively rigid molecular structures such as aromatic/cyclic moieties. These typical structures are often relatively linear and stiff. The linearity and stiffness of the cyclic/aromatic backbone reduces segmental rotation and allows for molecular ordering which results in lower CTE than many thermoplastic polymers having more flexible chains. In addition, the intermolecular associations of polyimide chains provide resistance to most solvents, which tends to reduce the solubility of many typical polyimide polymers in many solvents. The use of aliphatic monomers can reduce the stiffness of the polymer, if desired.

Polyimide polymers have a backbone, where the polymer backbone includes the string of atoms that form a chain from one end of the polymer to the other. Some compounds or sub-compounds which are not part of the polymer backbone can still be linked to the polymer. A tether refers to a molecular chain that is used to connect the polymer backbone to another compound, moiety, or sub-compound. A compound can be connected directly to the polymer backbone, or the compound can be connected using a tether.

Some compounds can be incorporated into a polyimide without being covalently connected to the polymer. For example, a compound can be dissolved or suspended in the polyamic reaction mass, and can then become entrapped in the polyimide during and after imidization. Often, compounds which are dissolved or suspended will tend to aggregate, so the final polyimide has areas where the compound is phase-separated into domains of higher concentrations of the compound, and other domains where the compound is less concentrated. Polyimide films that are otherwise transparent or translucent can include phase domains of a high enough concentration of a compound with sufficiently large diameters to exhibit light scattering manifesting in a hazy appearance. One way to determine if a compound includes aggregated inclusions is to examine the level of haze in the film as compared to the polyimide film without any compound. The presence of a haze tends to indicate macroscopic aggregated domains. Phase separation of a compound into domains of higher concentration with diameters sufficiently large to produce a haze is considered a macroscopic effect in this description, and therefore indicates the compound is not considered to be evenly distributed. The exact size of aggregated domains can vary somewhat for different compounds.

Specific properties of a polyimide can be influenced by incorporating certain compounds into the polyimide. The selection of monomers is one way to influence specific properties. Another way to influence properties is to add a compound or property modifying moiety to the polyimide. It can be difficult to covalently bond a compound along the length of a polymeric chain, and the total quantity of material added at the end of a polymeric chain is limited. The quantity of a compound that can be added to a polymer by dissolution or suspension can also be limited, because many compounds have limited solubility, and compounds in suspension tend to agglomerate into an uneven distribution in the polymer. An evenly dispersed compound or property modifying moiety is generally preferred to an unevenly dispersed compound or property modifying moiety because the polymer properties are more consistent with even dispersion. In this description, the term "evenly dispersed" is defined as one compound or moiety is evenly dispersed in a polymer, solution, or reaction mass on a macroscopic level. The haze value of a transmissive sample is the ratio of the intensity of scattered light to the intensity of total transmitted light. An evenly dispersed compound generally results in a haze value of less than 5%, and an unevenly dispersed compound generally results in a haze value of 5% or more. In this description, a compound is considered evenly dispersed in a polymer, solution, or reaction mass if a light path length of 8 to 12 microns produces a haze value of less than 5%. It is understood that there may be clusters on a microscopic level, even if a compound is evenly dispersed on a macroscopic level.

Polyurethanes

Polyurethanes are polymer composed of a chain of monomeric units joined by urethane links. Polyurethanes are extremely versatile owing to their relatively wide monomer availabilities, relatively low cost, and ease of processing. Polyurethane polymers are often formed by reacting an isocyanate with a polyol. For example, polyurethanes can be produced by reacting an isocyanate containing two or more isocyanates groups per molecule (R—(N=C=O)$_{n\geq2}$) with a polyol containing on average two or more hydroxy groups per molecule (R'—(OH)$_{n\geq2}$), in the presence of a chemical catalyst, heat, or both, as shown below:

NCO—R$_1$—NCO + HO—R$_2$—OH ⟶

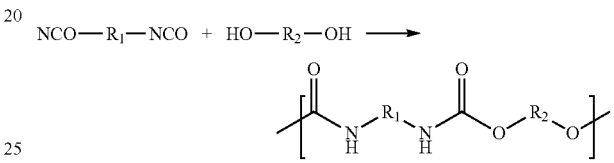

Isocyanates are often classified as either aromatic or aliphatic, depending on their structure. Toluene diisocyanate (TDI) methylene diphenyl diisocyanate, (MDI), 4,4'-diisocyanato dicyclohexylmethane (hydrogenated MDI), isophorone diisocyanate (IDPI), isocyanurate trimer of HDI (HDI trmer), naphthalene diisocynate (NDI), and hexamethylene diisocyanate (HMDI) are all isocyanates in relatively widespread commercial use. Isocyanates may be modified by partially reacting them with polyols or introducing some other materials to reduce volatility (and hence toxicity) of the isocyanates, decrease their freezing points to make handling easier or to improve the properties of the final polymers.

Polyols are most commonly polyether polyols, which are made by the reaction of epoxides with an active hydrogen containing starter compounds, or polyester polyols, which are made by the polycondensation of multifunctional carboxylic acids and hydroxyl compounds. They can be further classified according to their end use. Higher molecular weight polyols (molecular weights from 2,000 to 10,000) are used to make more flexible polyurethanes while lower molecular weight polyols make more rigid products. Some common polyols are polyethylene adipate, polypropylene glycol, poly(tetramethylene ether) glycol, polyethylene glycol, other polyester polyols, polycarbonate polyol, other polyether polyols, polycaprolactone polyol, and polybutadiene polyol.

Polyurethane products are provided in many shapes and forms for a variety of applications, including foams for insulation, sound dampening, seals, gaskets, and carpet underlay, durable elastomeric goods for wheels, tires, and automotive suspension bushings, conformal encapsulants as electrical potting compounds, and hard and soft plastic parts for a variety of other uses in industry.

Polyureas

Polyureas are polymer composed of a chain of monomeric units joined by urea linkages. Polyureas polymers are formed by reacting an isocyanate with a polyamine, as shown below:

NCO—R$_1$—NCO + H$_2$N—R$_2$—NH$_2$ ⟶

-continued

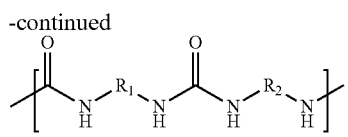

Many of the same type of precursors are used to form polyureas as are used to form polyurethanes, insofar as polyamines are substituted for polyols to react with the isocyanate. Some common polyamines used in the synthesis of polyureas include polyaspartic polyester, polyethylene adipate, polypropylene glycol, poly(tetramethylene ether) glycol, polyethylene glycol, polyester, polypropylene glycol, polycarbonate polyol, polyethers, polytetramethylene glycol, polycaprolactone polyol and polybutadiene polyol.

Polyureas are useful for coatings used in extreme environments in addition many of the same uses as polyurethanes.

Polyesters

Polyesters are defined as polymers containing at least one ester linking group per repeating unit of the polymer. Polyesters are a versatile class of polymers with many industrial uses including clothing, other fabrics, structural resins (such as bottles and piping) and even in some biodegradable applications. Polyesters may be synthesized in a number of ways, one example being a polyesterification reaction between dibasic acids and diols (or derivatives thereof). Another synthesis method involves the polymerization of a monomer that includes the acid and alcohol on the same monomer. A third synthesis method involves the ring opening polymerization of lactone monomers. The polyester synthesis between a diacid and a diol is shown below:

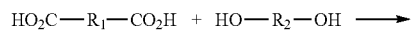

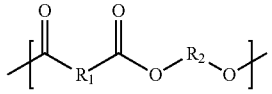

Polyester products are provided in many shapes and forms for a variety of applications, including fibers, yarns, cords, and ropes for the woven, knit, and nonwoven consumer and industrial textiles products industry, and bottles, films, thermoform sheets, and slit straps for the packaging industry. Specific polyesters with widespread commercial adoption include polyethylene terephthalate (PET), polybutylene terephthalate (PBT), polytrimethylene terephthalate (PTT), polyethylene naphthalate (PEN). In one aspect, the present disclosure provides an aerogel comprising polyglycolic acid (PGA), polylactic acid (PLA), polycaprolactone (PCL), polyethylene adipate (PEA), polyhydroxyalkanoate (PHA), polyhydroxybutyrate (PHB), poly(3-hydroxybutyrate-co-3-hydroxyvalerate) (PHBV), or poly(4-hydroxybenzoic acid-co-6-hydroxynaphthalene-2-carboxylic acid) (Vectran®) synthesized by the methods disclosed herein.

Polyamides

Polyesters are defined as polymers containing at least one amide linking group per repeating unit of the polymer. Polyamides are most often made from diamines and dibasic acids, lactams or β-amino acids. Some polyamides, similar to polyimides, are considered an AA-BB type polymer if two different classes of monomers are used to produce the polyamide polymer, Polyamides can also be prepared from AB type monomers. Polyamides may be produced by the interaction of an amine (—NHR$_1$) group and a carboxyl (—COR$_2$) group, or they may be formed by the polymerization of amino acids or amino-acid derivatives (whose molecules contain both amino and carboxyl groups). A representative AA-BB polyamide synthesis between a diacid and a diamine monomer is shown below:

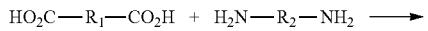

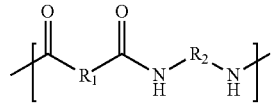

Phenolic Resins

Phenolic resins are a family of polymers which are commonly used in adhesives, coatings, automotive components and electrical components. Generally, phenolic resins are products of reacting phenols (or derivatives thereof) with formaldehyde (or derivatives thereof). Depending on the reaction conditions and the ratio of phenol to formaldehyde, two types of phenolic resins may be formed: (i) novolacs and (ii) resoles. Novolacs are formed in acidic conditions while resoles are formed in basic conditions.

Phenol is the most commonly used precursor, although cresols, p-tert-butylphenol, p-phenylphenol, cardanol and resorcinol can also be used.

An example of a novolac resin is shown below:

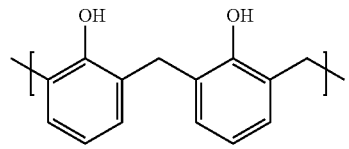

Synthesis of Aerogel

Synthesis of Polymer Gel

The first stage in the synthesis of an aerogel is the synthesis of a polymerized gel. For example, if a polyimide aerogel is desired, at least one acid monomer can be reacted with at least one diamino monomer in a reaction solvent to form a poly (amic acid). As discussed above, numerous acid monomers and diamino monomers may be used to synthesize the poly (amic acid). In one embodiment, the poly(amic acid) is contacted with an imidization catalyst in the presence of a chemical dehydrating agent to form a polymerized polyimide gel via an imidization reaction, Any imidization catalyst suitable for driving the conversion of polyimide precursor to the polyimide state is suitable for use in the methods of the present invention. Preferred chemical imidization catalysts comprise at least one compound selected from the group consisting of pyridine, methylpyridines, quinoline, isoquinoline, triethylenediamine, lutidine, N-methylmorpholine, triethylamine, tripropylamine, tributylamine, and other trialkylamines. Any dehydrating agent suitable for use in formation of an imide ring from an amic acid precursor is suitable for use in the methods of the present invention. Preferred dehydrating agents comprise at least one compound selected from the group consisting of acetic anhydride, propionic anhydride, n-butyric anhydride, benzoic, anhydride, trifluoroacetic anhydride, phosphorus trichloride, and dicyclohexylcarbodiimide.

The reaction solvent may be selected from the group consisting of dimethylsulfoxide, diethylsulfoxide, N,N-dimethylformamide, N,N-diethylformamide, N,N-dimethylacetamide, N,N-diethylacetamide, N-methyl-2-pyrrolidone, 1-methyl-2-pyrrolidinone, N-cyclohexyl-2-pyrrolidone, 1,13-dimethyl-2-imidazolidinone, diethyleneglycoldimethoxyether, o-dichlorobenzene, phenols, cresols, xylenol, catechol, butyrolactones, hexamethylphosphoramide, and mixtures thereof.

The polyimide solution may optionally be cast onto a casting sheet for a period of time. In one embodiment, the casting sheet is a polyethylene terephthalate (PET) casting sheet. After a passage of time, the polymerized gel is removed from the casting sheet and prepared for the solvent exchange process.

In one embodiment, a dye, such as an organic solvent-soluble dye, may be added to the diacid monomer/diamino monomer/reaction solvent solution. Generally, it is desirable to incorporate a dye into a polymer for use in certain applications, such as electrical insulation applications in mobile devices wherein a black polymer, or aerogel, is more desirable to the end user or manufacturer. Optionally, the dye may be added to the second solvent during the solvent exchange protocol discussed below.

Solvent Exchange

After the polymer gel is synthesized, it is desirable to conduct a solvent exchange wherein the reaction solvent is exchanged for a more desirable second solvent. Accordingly, in one embodiment, the present disclosure provides conducting a solvent exchange wherein the polymerized gel is placed inside of a pressure vessel and submerged in a mixture comprising the reaction solvent and the second solvent. Then, a high pressure atmosphere is created inside of the pressure vessel thereby forcing the second solvent into the polymerized gel and displacing a portion of the reaction solvent. Alternatively, the pressure exchange step may be conducted without the use of a high pressure environment.

It may be necessary to conduct a plurality of rounds of solvent exchange, as described below. In one embodiment, the solvent exchange may be conducted in step wise manner wherein the ratio of the reaction solvent to the second solvent is decreased during each round of solvent exchange. For example, where the reaction solvent is NMP and the second solvent is tert-butanol (see Example 1), the ratio of reaction solvent to second solvent may be progressively decreased from 75%/25% (ww) NMP/tert-butanol to 50%/50% NMP/tert-butanol to 25%/75% (w/w) NMP/tert-butanol. Eventually, the final solvent exchange may contain only second solvent, such as 100% tert-butanol as described in Example 1. Of course, other ratios of reaction solvent to second solvent would be known to those of ordinary skill in the art and should be considered within the scope of this disclosure.

The time necessary to conduct the solvent exchange will vary depending upon the type of polymer undergoing the exchange as well as the reaction solvent and second solvent being used. In one embodiment, each solvent exchange lasts approximately twenty four hours. In another embodiment, each solvent exchange lasts approximately 30 minutes.

Exemplary second solvents include methanol, ethanol, 1-propanol, 2-propanol, 1-butanol, 2-butanol, isobutanol, tert-butanol, 3-methyl-2-butanol, 3,3-dimethyl-2-butanol, 2-pentanol, 3-pentanol, 2,2-dimethylpropan-1-ol, cyclohexanol, diethylene glycol, cyclohexanone, acetone, acetyl acetone, 1,4-dioxane, diethyl ether, dichloromethane, trichloroethylene, chloroform, carbon tetrachloride, water, and mixtures thereof. Each second solvent has a freezing point. For example tert-butyl alcohol has a freezing point of 25.5 degrees Celsius and water has a freezing point of 0 degrees Celsius under one atmosphere of pressure.

The temperature and pressure used in the solvent exchange process may be varied. The duration of the solvent exchange process can be adjusted by performing the solvent exchange at a varying temperatures or atmospheric pressures, or both, provided that the pressure and temperature inside the pressure vessel does not cause either the first solvent or the second solvent to leave the liquid phase and become gaseous phase, vapor phase, solid phase, or supercritical fluid. Generally, higher pressures and/or temperatures decrease the amount of time required to perform the solvent exchange, and lower temperatures and/or pressures increase the amount of time required to perform the solvent exchange.

Cooling and Drying

After the solvent exchange, the polymerized gel is cooled below the freezing point of the second solvent and subjected to a freeze drying or lyophilization process to produce the aerogel. In one embodiment, the polymerized gel is cooled to a first temperature below the freezing point of the second solvent. For example, if the second solvent is water, then the polymerized gel is cooled to below 0 degrees Celsius. After cooling, the polymerized gel is subjected to a vacuum for a period of time wherein the second solvent is allowed to sublime.

In one embodiment, after cooling to a temperature below the freezing point of the second solvent, the cooled polymerized gel is placed onto a cooling slab, such as a stone slab or shelf within a lyophilization chamber previously cooled to approximately the same temperature as the polymerized gel, placed in a freeze drying apparatus, and subjected to a vacuum of less than 0.1 MPa for approximately 12 hours.

In another embodiment, after the majority of the second solvent has been removed through sublimation, the partially dried gel material is heated to a temperature near or above the boiling point of the second solvent for a period of time. In one embodiment, this period of time is approximately 4 hours.

During the sublimation process, a portion of the second solvent present in the polymerized gel has been removed, leaving the mesoporous and microporous gel. After the sublimation process is complete, or nearly complete, the aerogel has been synthesized.

EXAMPLES

The process described above can be used to introduce a wide variety of aerogels. Detailed below are three non-limiting examples of specific methods of aerogel manufacture.

Example 1

BPDA/ODA-IDMB Polyimide Aerogel with Low Pressure Solvent Exchange Process

To a clean, dry, 1 liter (1) reactor equipped with an overhead stirrer and rubber septa were added 10.60 grams (g) 2,2'-dimethylbenzidine (DMB), 10.00 g 4,4-oxydianiline (ODA), 1.15 JEFFAMINE T-403 (T-403), and 448.21 g N-methylpyrrolidone (NMP). The reactor was sealed while the solution was stirred vigorously with the overhead stirrer until the reagents dissolved. To this solution was added 31.48 g 3,3',4,4'-biphenyltetracarboxylic dianhydride (symmetric BPDA, or BPDA), and the mixture was stirred until all BPDA had dissolved and reacted to form the poly(amic acid). In a separate flask, 67.73 g of pyridine and 87.52 g of acetic anhydride were mixed. The pyridineacetic anhydride mixture was then poured into the reactor containing poly(amic acid) resin while mixing vigorously.

After approximately 5 minutes of mixing, the resin was cast into a film on a polyethylene terephthalate (PET) casting sheet using a doctor blade set at approximately 535 microns.

After approximately 45 minutes, the now-gelled material affixed to the PET casting sheet was rolled up and allowed to set undisturbed for 24 hours.

After 24 hours the gel was removed from the casting sheet and solvent exchanged by progressive 24 hour submersions in the following solvents: 7525 (w/w) NMP/tert-butanol; 50/50 NMP/tert-butanol; 25/75 (w/w) NMP/tert-butanol; tert-butanol.

This gel was then cooled to −20 degrees Celsius for two hours, placed on a stone slab that was previously chilled to −20 degrees Celsius, placed in a freeze drying apparatus and subjected to vacuum conditions with pressure <0.1 MPa for approximately 12 hours. The recovered aerogel was approximately 400 microns thick.

Example 2

BPDA/ODA-DMB Polyimide Aerogel with High Pressure Solvent Exchange Process

The same reaction, gelation, casting, and freeze drying procedure was followed from Example 1. During each solvent exchange process, the gel material was completely submersed in the exchange solvent and subjected to approximately 80 psi of pressure in a pressure vessel, using a gas such as argon or nitrogen for approximately 15-30 minutes for each step of the solvent exchange process. The final polyimide aerogel was approximately 400 microns thick.

Example 3

BPDA/ODA Polyimide Aerogel with High Pressure Solvent Exchange Process

To a clean, dry, 1 liter (1) reactor equipped with an overhead stirrer and rubber septa were added 20.19 g ODA, 1.15 g T403, and 448.00 g NMP. The reactor was sealed while the solution was stirred vigorously with the overhead stirrer until the reagents dissolved. To this solution was added 31.85 g BPDA, and the mixture was stirred until all BPDA had dissolved and reacted to form the poly(amic acid). In a separate flask, 68.59 g of pyridine and 88.52 g of acetic anhydride were mixed. The pyridine/acetic anhydride mixture was then poured into the reactor containing poly(amic acid) resin while mixing vigorously. The mixture was cast into a film, gelled, solvent exchanged, and freeze dried as described in Example 2. The final polyimide aerogel was approximately 400 microns thick.

Example 4

6FDA-BPDA/DMB Polyimide Aerogel with High Pressure Solvent Exchange Process

To a clean, dry, 1 liter (l) reactor equipped with an overhead stirrer and rubber septa were added 10.95 g DMB, 0.58 g T403, and 268.65 g NMP. The reactor was sealed while the solution was stirred vigorously with the overhead stirrer until the reagents dissolved. To this solution was added 8.13 g BPDA and 12.27 g 4-4'-[hexafluoroisopropylidene]diphthalic anhydride (6FDA), and the mixture was stirred until all BPDA and 6FDA had dissolved and reacted to form the poly(amic acid). In a separate flask, 34.96 g of pyridine and 45.13 g of acetic anhydride were mixed. The pyridineacetic anhydride mixture was then poured into the reactor containing poly(amic acid) resin while mixing vigorously. The mixture was cast into a film, gelled, solvent exchanged, and freeze dried as described in Example 2. The final polyimide aerogel was approximately 250 microns thick.

Example 5

Dyed BPDA/ODA Polyimide Aerogel with High Pressure Solvent Exchange Process

To a clean, dry, 1 liter (1) reactor equipped with an overhead stirrer and rubber septa were added 20.31 g ODA, 1.15 g T403, and 449.06 g NMP. The reactor was sealed while the solution was stirred vigorously with the overhead stirrer until the reagents dissolved. To this solution was added 31.91 g BPDA, and the mixture was stirred until all BPDA had dissolved and reacted to form the poly(amic acid). To this mixture was added 2.26 g of savinyl black dye. The reactor was sealed while the solution was stirred vigorously with the overhead stirrer until the dye had dissolved. In a separate flask, 68.54 g of pyridine and 88.49 g of acetic anhydride were mixed. The pyridineacetic anhydride mixture was then poured into the reactor containing poly(amic acid) resin while mixing vigorously. The mixture was cast into a film, gelled, solvent exchanged, and freeze dried as described in Example 2. The final polyimide aerogel was approximately 200 microns thick.

The invention claimed is:

1. A method of producing an aerogel, the method comprising:
   a. reacting at least one acid monomer with at least one diamino monomer in a first solvent under conditions appropriate to form a polyimide polymer;
   b. conducting a solvent exchange wherein the first solvent is exchanged for a second solvent, said second solvent having an evaporation point, wherein said solvent exchange further comprises (i) submersing the polyimide polymer in the second solvent in a pressure vessel and (ii) creating a high pressure inside the pressure vessel for a first period of time;
   c. cooling the polyimide polymer to a first temperature below the freezing point of the second solvent; and
   d. subjecting cooled polyimide polymer to a first vacuum for a second period of time at a second temperature.

2. The method of claim 1, wherein the at least one acid monomer is a dianhydride.

3. The method of claim 2, wherein the at least one diamino monomer is 4,4'-oxydianiline.

4. The method of claim 1, further comprising adding polyetheramine to the at least one acid monomer and the at least one diamino monomer before the formation of the polyimide polymer.

5. The method of claim 1, wherein the first solvent is dimethylsulfoxide.

6. The method of claim 1, wherein the solvent exchange is conducted in a step-wise manner.

7. The method of claim 1, wherein the second solvent is tert-butanol.

8. The method of claim 1, further comprising (i) compressing a gas in the pressure vessel during the creation of the high pressure or (ii) using a pressurized gas during the creation of the high pressure.

9. The method of claim 1 further comprising the addition of a dye to step (a) or to step (b).

10. A method of producing an aerogel, the method comprising:
   a. reacting at least one acid monomer with at least one diamino monomer in a first solvent under conditions appropriate to form a polyimide polymer;

b. conducting a solvent exchange wherein the first solvent is exchanged for a second solvent, said second solvent having an evaporation point;
c. cooling the polyimide polymer to a first temperature below the freezing point of the second solvent; and
d. subjecting cooled polyimide polymer to a first vacuum for a second period of time at a second temperature.

11. The method of claim 10, wherein the at least one acid monomer is a dianhydride.

12. The method of claim 11, wherein the at least one diamino monomer is 4,4'-oxydianiline.

13. The method of claim 12, further comprising adding polyetheramine to the at least one acid monomer and the at least one diamino monomer before the formation of the polyimide polymer.

14. The method of claim 13, wherein the first solvent is dimethylsulfoxide.

15. The method of claim 10, wherein the solvent exchange is conducted in a step-wise manner.

16. The method of claim 14, wherein the second solvent is tert-butanol.

17. A method of producing an aerogel, said method comprising:
a. reacting a first monomer with a second monomer in a first solvent to form a polymerized gel; and
b. conducting a solvent exchange in a step-wise manner, wherein the first solvent is exchanged for a second solvent, wherein said solvent exchange further comprises subjecting the polymerized gel to a positive pressure;
c. cooling the polymerized gel to a first temperature below a freezing point of the second solvent; and
d. subjecting cooled polymer gel to a vacuum for a period of time at a second temperature.

18. The method of claim 17, wherein the polymerized gel is a polyimide polymerized gel.

19. The method of claim 17, wherein the polymerized gel is a polyimide polymerized gel and the first monomer is an acid monomer and the second monomer is a diamino monomer.

20. The method of claim 19, wherein the acid monomer is a dianhydride.

21. The method of claim 20, wherein the diamino monomer is 4,4'-oxydianiline.

22. The method of claim 19, wherein the first solvent is dimethylsulfoxide.

23. The method of claim 22, wherein the second solvent is tert-butanol.

* * * * *